(12) United States Patent
Esmaeilzadeh

(10) Patent No.: US 7,294,596 B2
(45) Date of Patent: Nov. 13, 2007

(54) SINTERED CERAMIC MATERIAL WITH IMPROVED PROPERTIES AND METHOD FOR ITS MANUFACTURING

(75) Inventor: Saeid Esmaeilzadeh, Stockholm (SE)

(73) Assignee: Diamorph Ceramic AB, Stockholm (SE)

( * ) Notice: Subject to any disclaimer, the term of this patent is extended or adjusted under 35 U.S.C. 154(b) by 114 days.

(21) Appl. No.: 11/078,615

(22) Filed: Mar. 14, 2005

(65) Prior Publication Data
US 2007/0225150 A1    Sep. 27, 2007

(51) Int. Cl.
C04B 35/599 (2006.01)
C04B 35/565 (2006.01)
C04B 35/584 (2006.01)

(52) U.S. Cl. ................ 501/98.1; 501/98.2; 501/98.3; 501/87; 501/92; 501/97.1; 501/97.2; 501/97.3

(58) Field of Classification Search ........... 501/98.1, 501/98.2, 98.3
See application file for complete search history.

(56) References Cited

U.S. PATENT DOCUMENTS 5,316,856 A * 5/1994 Suzuki et al. ............ 428/446
5,316,988 A * 5/1994 O'Brien et al. ............ 501/98.2
2004/0067838 A1    4/2004 Mandal et al.
2005/0020432 A1    1/2005 Donald et al.

FOREIGN PATENT DOCUMENTS

| JP | 10029869 | 2/1998 |
| JP | 11-343173 | * 12/1999 |
| JP | 2001019550 | * 1/2001 |

OTHER PUBLICATIONS

"Thermal Stability of Calcium a-slalon Ceramics" Hewett et al., *Journal of the European Ceramic Society* 18, 1998 pp. 417-427.

* cited by examiner

*Primary Examiner*—Karl Group
(74) *Attorney, Agent, or Firm*—Connolly Bove Lodge and Hutz

(57) ABSTRACT

A sintered ceramic material comprises a crystalline phase and an intergranular phase comprising a glass phase. The material is manufactured from a starting powder being mixed with an additive comprising one or more metal from a group of Li, Na, Mg, Ca, Sr, Ba, Sc, Y, La, Ce, Pr, Nd, Sm, Eu, Gd, Tb, Dy, Ho, Er, Tm, Yb, Th, Pa or U. The additive is in non oxide form, or in a form which transforms to a metal or nitride during a synthesis in nitrogen atmosphere and the resulting glass phase having a high nitrogen content with a N:O ratio higher than 35:65 and a glass transition temperature above 950° C.

5 Claims, 1 Drawing Sheet

SINTERED CERAMIC MATERIAL WITH IMPROVED PROPERTIES AND METHOD FOR ITS MANUFACTURING

FIELD OF THE INVENTION

The invention relates to sintered ceramic materials comprising a crystalline phase and an intergranular phase and especially to silicon nitride and sialon-based ceramics but also ceramics based on other hard phases, such as silicon carbide. A method for manufacturing such ceramics is based on selecting additives as sintering agents which improve the sintering process and the resulting intergranular glass phase.

BACKGROUND OF THE INVENTION $Si_3N_4$ and SiAlON based ceramic materials have been intensively investigated during the last decades due to their superior mechanical properties with good thermal stability and excellent thermo-shock properties. These properties have a wide range of applications and used such as ceramic cutting tools, ceramic bearings, ceramic substrate, space industry, and continues to receive attention in the automotive component market. As compared with carbide-based materials, or steel materials, silicon nitride generally offers the potential of relatively high heat resistance and chemical stability, relatively low density, good mechanical properties such as hardness and toughness, and good electrical insulation characteristics. To illustrate the advantages, in the context of the cutting tool industry, these properties can combine in whole or in part to allow operations to proceed at higher speeds and temperatures, with resulting potential cost savings. The potential market for the above properties indicates use in other applications, such as, extrusion dies and automotive components, turbocharger components, swirl chambers, and engine valve.

Single-phase of $Si_3N_4$ is a high covalent compound and exist in 2 hexagonal polymorphic crystalline forms $\alpha$- and $\beta$-$Si_3N_4$, $\beta$-$Si_3N_4$ being stable than the $\alpha$ form. The structure of $\alpha$- and $\beta$-$Si_3N_4$ is build up from basic $SiN_4$ tetrahedra joined in three-dimensional network by sharing corners, with common nitrogen to the three tetrahedral sites. Either structure can be generated from the other by a 180° rotation of 2 basal planes. The $\alpha$- to $\beta$-$Si_3N_4$ transition is usually by a solution-precipitation reaction of $Si_3N_4$ and molten glass. The strong covalent bonds of $Si_3N_4$ produce some mechanical and engineering properties for these materials such as: low thermal expansion coefficient, which results to good thermal shock resistance, high strength which results to high toughness, greater Young's modulus than some metals, thermal stability, up to 1800° C., which is temperature when $Si_3N_4$ starts to decompose. The weak point of this material is difficulties of self-diffusion and production of $Si_3N_4$ into a dense body by classical method of ceramic processing technology. This problem can be helped to a large extent by using sintering additives, glass-formers and formation of sialons by substituting silicon and nitrogen with aluminium and oxygen.

Nitrogen rich sialon phases have been extensively studied in connection with the development of high performance ceramics, especially in $\alpha$- and $\beta$-sialon systems [T. Ekström and M. Nygren, J. Am. Ceram. Soc., 75, 259 (1992)]. The structure of $\alpha$-$Si_3N_4$ was established using single crystal X-ray diffraction (XRD) data and film methods [R. Marchand et al, Acta Cryst. B25, 2157 (1969)] and more accurate atomic positions were obtained in later single crystal XRD studies [I. Kohatsu et al, Mat. Res. Bul., 9, 917 (1974) and K. Kato et al., J. Am. Ceram. Soc., 58, 90 (1975)]. Structural changes of $\alpha$-$Si_3N_4$ with temperature, below 900 C have also been investigated using neutron powder diffraction data [M. Billy et al., Mat. Res. Bul., 18, 921 (1983)]. The $\alpha$-$Si_3N_4$ crystallises in the space group P31c with the unit cell parameters a=7.7523(2), c=5.6198(2) Å, V=292.5 Å$^3$ [Powder Diffraction File 41-0360, International Centre for Diffraction Data, Newtown Square, Pa.] and unit cell content $Si_{12}N_{16}$.

The $\alpha$-sialons are solid solutions that have a filled $\alpha$-$Si_3N_4$ type structure. There are two substitution mechanisms. First, silicon and nitrogen can be substituted simultaneously by aluminium and oxygen. Second, the structure has two large, closed cavities per unit cell that can accommodate additional cations of metals, M=Li, Mg, Ca, Y, and Rare Earth (RE) elements. A general formula for $\alpha$-sialons can thus be written as $M_x Si_{12-(m+n)} Al_{(m+n)} O_n N_{16-n}$, where x (=m/v)$\leq$2, and v is the average valency of the M cation. For all of the known $\alpha$-sialon compositions the m/(m+n) ratio is found to be below 0.67. Examples of reported $\alpha$-sialon phases are Y.5 (Si9.75 Al2.25) (N15.25 O0.75) and Ca.67 (Si10 Al2) (N15.3 O0.7) [F. Izumi et al., Journal of Materials Science, 19, 3115 (1984)]. This is likely due to the synthesis approach that is usually used with metal oxides or carbonates of M=Li, Mg, Ca, Y, and RE as additives used either as substitution in $\alpha$-sialon crystal structure or as glass-formers and sintering additives. The addition of M in the form of oxides incorporates oxygen atoms in the sialon system.

In the Swedish patent application SE 0300056-9 is described a method for obtaining nitrogen rich glass phases by using non oxide additives. The mechanical properties of the nitrogen rich glass phases have been reported to be improved with the increased nitrogen content.

Even though $\alpha$-sialon phases have been used in many different commercial applications, specially as single phase ceramics or together with other compounds in composite ceramics, and despite an intensive scientific investigations and developments in this field there has been crucial limitations in the chemical compositions of the crystalline $\alpha$-sialon phases as well as in the intergranular glassy phase found in the ceramic bodies produced.

One of the important uses of sialon-based ceramics or silicon nitride or silicon carbide is their high temperature applications. The most important parameter for high temperature applications is the inter-granular glass phase in the ceramics. By increasing the nitrogen content and thereby getting better mechanical properties and higher glass transition temperatures the obtained ceramics show much better high temperature stability with respect to chemical stability as well as mechanical stability.

SUMMARY OF THE INVENTION

This invention presents a new group of sintered ceramic materials, such as silicon nitride, silicon carbide or sialon-based ceramics and a new method of producing those.

The new ceramics comprises nitrogen rich intergranular glass phases. The sialon-based ceramics can also comprise alpha-sialon phases with high nitrogen content.

The nitrogen rich intergranular glass phases obtained during the production of the sintered ceramic materials improve the properties of the sintered ceramic bodies in several aspects. The liquid phase obtained during the synthesis provides elongated crystallites having good reinforcement properties. The superior mechanical properties of the nitrogen rich glass phases provide ceramics with improved hardness and improved fracture toughness. The increased glass transition temperature by increasing nitrogen concentration of the glass phases gives ceramics with better creep resistance and therefore improved high temperature properties. The glass phase can have a nitrogen content with a N:O ratio higher than 35:65 and the glass transition temperature can be above 950° C.

The method for manufacturing the sintered ceramic materials includes synthesis at temperatures generally in the range of 1500-1800° C. in nitrogen atmosphere using a starting powder together with sintering agents comprising additives such as Li, Na, Mg, Ca, Sr, Ba, Sc, Y, La, Ce, Pr, Nd, Sm, Eu, Gd, Tb, Dy, Ho, Er, Tm, Yb, Th, Pa or U. The additives are used as non oxide precursors such as pure metal, nitrides or hydrides or other sources that transforms to nitrides or metallic state in the nitrogen atmosphere at elevated temperatures used during the synthesis. The above mentioned metals can also be added as oxides or carbonates if used together with graphite in nitrogen atmosphere in order to form the metal nitride through a carbothermal reduction. The densification can be obtained by using a hot pressing synthesis, a gas-pressure synthesis or at ambient pressure.

This unique process provides a possibility to incorporate additives in synthesis of silicon nitride, silicon carbide or sialon-based ceramics without simultaneous incorporation of oxygen atoms. The materials obtained by this process have been found to posses good mechanical properties such as high Vickers hardness values typically above 18.0 Gpa and values as high as 22.3 Gpa and fracture toughness values typically above 5.0 MPa·m$^{1/2}$ and values as high as 7.8 MPa·m$^{1/2}$.

Another important aspect of the invention is that sintered ceramic materials comprising new α-sialon compositions can be obtained were the aluminium content in the crystalline phase is fully or partially balanced by addition of the stabilising metals rather than the exchange of nitrogen by oxygen.

An embodiment of the invention includes a synthesis method to prepare ceramic materials comprising α-sialons with new compositions. By using non oxide additives or by reducing an additive in oxide form in the synthesis process, the concentration of oxygen in the α-sialon can be significantly reduced. The α-sialon compositions can be described by the formula $M_xSi_{12-(m+n)}Al_{(m+n)}O_nN_{16-n}$, where x (=m/v)≦2, and v is the average valency of the M cation. The new compositions obtained by this method have one of the following elements M, or combinations thereof, in the cavity of the α-sialon structure: Li, Na, Mg, Ca, Sr, Ba, Sc, Y, La, Ce, Pr, Nd, Sm, Eu, Gd, Tb, Dy, Ho, Er, Tm, Yb, Th, Pa or U. At the same time the ratio of m/(m+n) must be higher than 0.7, or higher than 0.8 or 0.9.

For the sintering process the liquid phase is important as well as the solidified liquid which forms an intergranular glass phase. According to the invention the glass phase can be formed with significantly higher nitrogen content. This is possible since the precursors used in the synthesis as additives are non oxide materials, or a mixture of precursors which transforms to a nitride during the synthesis in nitrogen atmosphere, and therefore it allows much higher nitrogen incorporation due to the metal nitrides that are formed which are very reactive and act as glass modifiers.

The synthesis processes according to the invention allows for production of highly densified silicon nitride, silicon carbide or sialon based ceramics. The densification is promoted by higher concentrations of additives. The additives are important components in the process of forming the liquid phase, which is essential for the recrystallisation of the crystalline silicon nitride or sialon phases. The densification can be obtained by using a hot pressing synthesis, a gas-pressure synthesis or synthesis at ambient pressure.

The sintered ceramic material can be used as powder samples, sintered ceramic bodies or thin films in different applications such as ceramic cutting tools, ceramic ball bearings, ceramic gas turbines, ceramic body implants, wear resistant ceramics, magneto-optical applications, substrates for electronics and luminescent materials. The sintered ceramic material can comprise other materials such as whiskers or other reinforcement structures or be applied with surface layers of other materials.

DETAILED DESCRIPTION OF THE INVENTION

Examples

Figure 1:
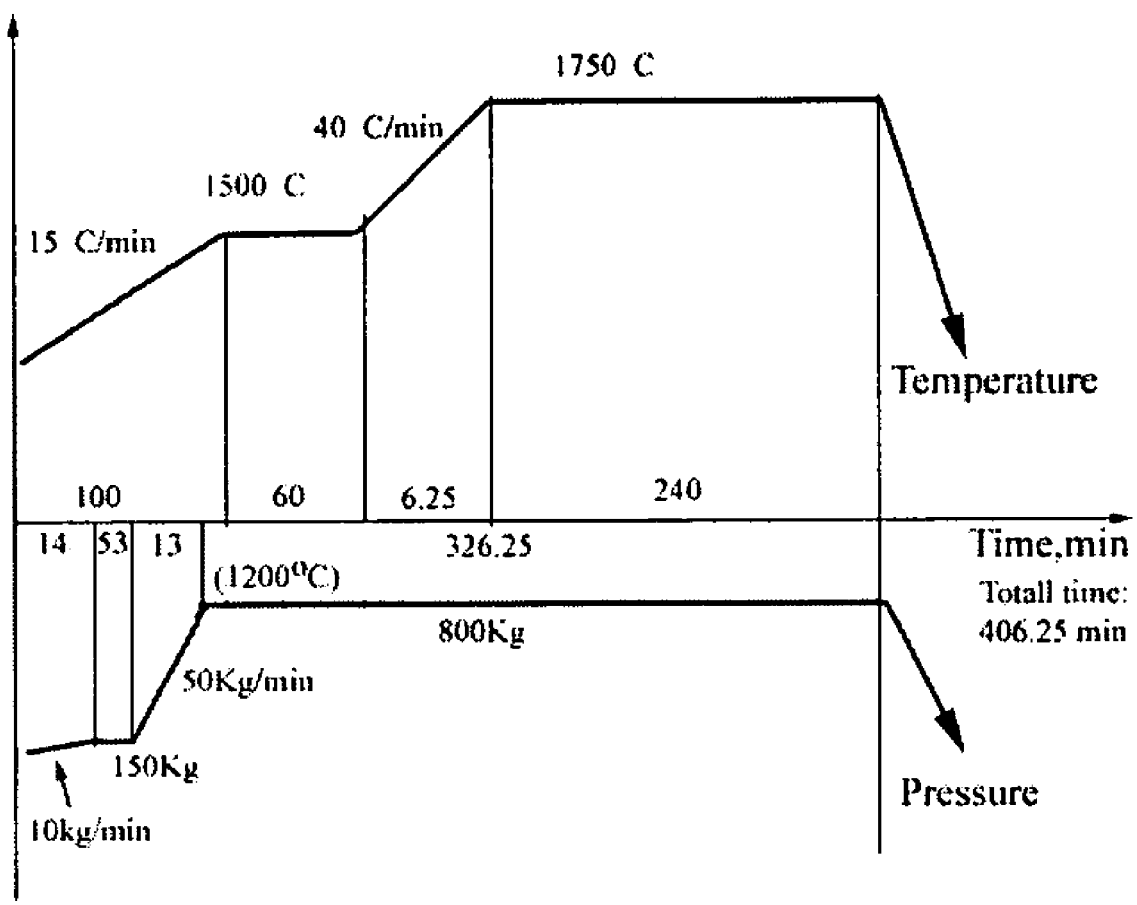
FIG. 1 is an example of a Hot Pressing schedule for samples preparation.

Synthesis Procedures Used for the Below Mentioned Examples:

The silicon nitride, silicon carbide and sialon ceramics were obtained with other crystalline and amorphous glass phases by using pressure less synthesis in a graphite furnace, radio frequency induction furnace or a hot pressing synthesis using a uni-axial pressure of 32 Mpa. The synthesis atmosphere used was nitrogen independent of the furnace used. The precursors used in every specific synthesis were carefully ground and pressed to pellets, before placing in the furnace. In those cases were nitrides, hydrides or pure metals of additives such as Mg, Ca, Sr, Y or rare earths were used, contacts with air was avoided in order to avoid oxidation of those precursors.

The hot-pressed samples were prepared under a uni-axial pressure of 32 Mpa at 1750° C. during 4 hours in flowing nitrogen atmosphere. The samples synthesised in the graphite furnace or the radio frequency furnace was prepared at 1750° C. during 4 hours in flowing nitrogen atmosphere, using ambient gas pressure.

| Sample ID | M additives mol % | $Si_3N_4$ mol % | $Al_2O_3$ mol % | AlN mol % |
|---|---|---|---|---|
| ACN0 | $Ca_3N_2$ 0 | 67.05835 | 32.94165 | 0 |
| ACN1 | $Ca_3N_2$ 0.862295 | 66.48011 | 32.6576 | 0 |
| ACN3 | $Ca_3N_2$ 2.594102 | 65.31879 | 32.08711 | 0 |
| ACN5 | $Ca_3N_2$ 4.335598 | 64.15097 | 31.51344 | 0 |
| ACN7 | $Ca_3N_2$ 6.086865 | 62.9766 | 30.93654 | 0 |
| ACN9 | $Ca_3N_2$ 7.847985 | 61.79562 | 30.3564 | 0 |
| ACN11 | $Ca_3N_2$ 9.619042 | 60.60798 | 29.77298 | 0 |
| ACH1 | $CaH_2$ 2.972205 | 65.06524 | 31.96256 | 0 |
| ACH3 | $CaH_2$ 8.574967 | 61.30812 | 30.11692 | 0 |
| ACH5 | $CaH_2$ 13.76422 | 57.82829 | 28.40749 | 0 |
| ACH7 | $CaH_2$ 18.58412 | 54.59614 | 26.81974 | 0 |
| ACH9 | $CaH_2$ 23.07274 | 51.58615 | 25.34111 | 0 |
| ACH11 | $CaH_2$ 27.2631 | 48.77616 | 23.96074 | 0 |
| AYH1 | $YH_3$ 1.383301 | 66.13073 | 32.48597 | 0 |
| AYH3 | $YH_3$ 4.118015 | 64.29687 | 31.58511 | 0 |
| AYH5 | $YH_3$ 6.811022 | 62.49099 | 30.69799 | 0 |
| AYH7 | $YH_3$ 9.463271 | 60.71243 | 29.82429 | 0 |
| AYH9 | $YH_3$ 12.07568 | 58.9606 | 28.96372 | 0 |
| AYH11 | $YH_3$ 14.64913 | 57.23488 | 28.11599 | 0 |
| BCN0 | $Ca_3N_2$ 0 | 59.15281 | 16.87378 | 23.97341 |
| BCN1 | $Ca_3N_2$ 0.743984 | 58.71272 | 16.74824 | 23.79506 |
| BCN3 | $Ca_3N_2$ 2.243556 | 57.82568 | 16.4952 | 23.43556 |

-continued

| Sample ID | M additives mol % | Si$_3$N$_4$ mol % | Al$_2$O$_3$ mol % | AlN mol % |
|---|---|---|---|---|
| BCN5 | Ca$_3$N$_2$ 3.758802 | 56.92937 | 16.23952 | 23.0723 |
| BCN7 | Ca$_3$N$_2$ 5.289969 | 56.02365 | 15.98116 | 22.70523 |
| BCN9 | Ca$_3$N$_2$ 6.837309 | 55.10835 | 15.72006 | 22.33428 |
| BCN11 | Ca$_3$N$_2$ 8.40108 | 54.18334 | 15.4562 | 21.95939 |
| BCN13 | Ca$_3$N$_2$ 9.981544 | 53.24845 | 15.18951 | 21.5805 |
| BCN15 | Ca$_3$N$_2$ 11.57897 | 52.30352 | 14.91997 | 21.19754 |
| BCH1 | CaH$_2$ 2.571915 | 57.63145 | 16.4398 | 23.35684 |
| BCH3 | CaH$_2$ 7.478267 | 54.72921 | 15.61191 | 22.18062 |
| BCH5 | CaH$_2$ 12.09162 | 52.00028 | 14.83346 | 21.07464 |
| BCH7 | CaH$_2$ 16.43745 | 49.4296 | 14.10016 | 20.0328 |
| BCH9 | CaH$_2$ 20.53838 | 47.00378 | 13.40818 | 19.04966 |
| BCH11 | CaH$_2$ 24.41454 | 44.71092 | 12.75412 | 18.12041 |
| BCH13 | CaH$_2$ 28.08392 | 42.54038 | 12.13496 | 17.24074 |
| BCH15 | CaH$_2$ 31.56264 | 40.48262 | 11.54797 | 16.40677 |
| BCH1 | CaH$_2$ 2.571915 | 57.63145 | 16.4398 | 23.35684 |
| BYH1 | YH$_3$ 1.194367 | 58.44631 | 16.67224 | 23.68708 |
| BYH3 | YH$_3$ 3.569086 | 57.0416 | 16.27154 | 23.11778 |
| BYH5 | YH$_3$ 5.925302 | 55.64783 | 15.87395 | 22.55292 |
| BYH7 | YH$_3$ 8.263229 | 54.26488 | 15.47946 | 21.99244 |
| BYH9 | YH$_3$ 10.58308 | 52.89262 | 15.08801 | 21.43629 |
| BYH11 | YH$_3$ 12.88506 | 51.53093 | 14.69958 | 20.88442 |
| BYH13 | YH$_3$ 15.16938 | 50.17969 | 14.31413 | 20.33679 |
| BYH15 | YH$_3$ 17.43625 | 48.83878 | 13.93162 | 19.79335 |
| CCH2 | CaH$_2$ 1.639344 | 95.08197 | 0 | 3.278689 |
| CCH4 | CaH$_2$ 3.225806 | 90.32258 | 0 | 6.451613 |
| CCH6 | CaH$_2$ 4.761905 | 85.71429 | 0 | 9.52381 |
| CCH8 | CaH$_2$ 6.25 | 81.25 | 0 | 12.5 |
| CCH10 | CaH$_2$ 7.692308 | 76.92308 | 0 | 15.38462 |
| CCH12 | CaH$_2$ 9.090909 | 72.72727 | 0 | 18.18182 |
| CCH14 | CaH$_2$ 10.44776 | 68.65672 | 0 | 20.89552 |
| CCH16 | CaH$_2$ 11.76471 | 64.70588 | 0 | 23.52941 |
| CCH18 | CaH$_2$ 13.04348 | 60.86957 | 0 | 26.08696 |
| CCH20 | CaH$_2$ 14.28571 | 57.14286 | 0 | 28.57143 |
| CCH22 | CaH$_2$ 15.49296 | 53.52113 | 0 | 30.98592 |
| CCH24 | CaH$_2$ 16.66667 | 50 | 0 | 33.33333 |
| CCH26 | CaH$_2$ 17.80822 | 46.57534 | 0 | 35.61644 |

Summary of the properties of the Sialons series ACN

| Sample | β/(β + α) % | Density g/cm$^3$ | Anstis Eq. Hv10/Gpa | Anstis Eq. Klc/MPa·m$^{1/2}$ | Evans Eq. Hv10/Gpa | Evans Eq. Klc/MPa·m$^{1/2}$ |
|---|---|---|---|---|---|---|
| ACN0 | 100 | 3.08 | 17.53292 | 3.612283 | 16.48094 | 3.826872 |
| ACN1 | 100 | 3.0566 | 15.62933 | 4.618255 | 14.69157 | 4.634782 |
| ACN3 | 100 | 3.0527 | 14.44533 | 5.240804 | 13.57861 | 5.055537 |
| ACN5 | 96.54836 | 3.0724 | 14.27751 | 5.796372 | 13.42086 | 5.569019 |
| ACN7 | 67.7458 | 3.0805 | 14.09635 | 5.685276 | 13.25057 | 5.417354 |
| ACN9 | 0 | 3.076955 | 14.77238 | 5.038721 | 13.88604 | 4.912925 |
| ACN11 | 0 | 3.09024 | 14.66501 | 5.037055 | 13.78511 | 4.898503 |

Summary of the properties of the Sialons series ACH

| Sample | β/(β + α) % | Density g/cm$^3$ | Anstis Eq. Hv10/Gpa | Anstis Eq. Klc/MPa·m$^{1/2}$ | Evans Eq. Hv10/Gpa | Evans Eq. Klc/MPa·m$^{1/2}$ |
|---|---|---|---|---|---|---|
| ACH0 | 100 | 3.095507 | 17.53292 | 3.612283 | 16.48094 | 3.826872 |
| ACH1 | 100 | 3.053208 | 15.55196 | 6.024011 | 14.61884 | 6.033627 |
| ACH3 | 100 | 3.061216 | 14.54094 | 6.798107 | 13.66848 | 6.584339 |
| ACH5 | 41.18 | 3.064889 | 14.61225 | 6.976299 | 13.73551 | 6.771373 |
| ACH7 | 0 | 3.078048 | 14.63928 | 6.033907 | 13.76093 | 5.86483 |
| ACH9 | 0 | 3.094414 | 14.64181 | 6.203564 | 13.7633 | 6.026137 |
| ACH11 | 0 | 3.101292 | 14.50766 | 6.719623 | 13.6372 | 6.496082 |

Summary of the properties of the Sialons series AYH

| Sample | β/(β + α) % | Density g/cm$^3$ | Anstis Eq. Hv10/Gpa | Anstis Eq. Klc/MPa·m$^{1/2}$ | Evans Eq. Hv10/Gpa | Evans Eq. Klc/MPa·m$^{1/2}$ |
|---|---|---|---|---|---|---|
| AYH0 | 100 | 3.095507 | 17.53292 | 3.612283 | 16.48094 | 3.826872 |
| AYH1 | 100 | 3.087349 | 15.24156 | 3.893238 | 14.32706 | 3.853799 |
| AYH3 | 100 | 3.116616 | 15.43856 | 5.993128 | 14.51224 | 5.974895 |
| AYH5 | 100 | 3.146806 | 15.61033 | 6.700456 | 14.67371 | 6.717924 |
| AYH7 | 100 | 3.176941 | 15.14566 | 6.250303 | 14.23692 | 6.175651 |
| AYH9 | 100 | 3.227942 | 15.48808 | 4.70451 | 14.5588 | 4.701522 |
| AYH11 | 100 | 3.250527 | 15.43711 | 5.178389 | 14.51088 | 5.153055 |

Summary of the properties of the Sialons Series BCN

| Sample | β/(β + α) % | Density g/cm$^3$ | Anstis Eq. Hv10/Gpa | Anstis Eq. Klc/MPa·m$^{1/2}$ | Evans Eq. Hv10/Gpa | Evans Eq. Klc/MPa·m$^{1/2}$ |
|---|---|---|---|---|---|---|
| BCN0 | 100 | 3.116545 | 16.97882 | 2.87493 | 15.96009 | 3.004464 |
| BCN1 | 100 | 3.113059 | 16.31949 | 3.71854 | 15.34032 | 3.812591 |
| BCN3 | 81.56028 | 3.130743 | 15.63141 | 4.996595 | 14.69353 | 5.016933 |
| BCN5 | 26.30682 | 3.131679 | 16.3352 | 5.148826 | 15.35509 | 5.283804 |
| BCN7 | 2.322811 | 3.136044 | 16.77213 | 5.348145 | 15.7658 | 5.559463 |
| BCN9 | 0 | 3.138872 | 16.70415 | 6.168082 | 15.7019 | 6.399857 |
| BCN11 | 0 | 3.150882 | 16.81784 | 6.75428 | 15.80877 | 7.027636 |
| BCN13 | 0 | 3.176742 | 18.54305 | 7.342049 | 17.43047 | 8.028149 |
| BCN15 | 0 | 3.216012 | 17.55163 | 6.928511 | 16.49853 | 7.367585 |

Summary of the properties of the Sialons Series BCH

| Sample | β/(β + α) % | Density g/cm$^3$ | Anstis Eq. Hv10/Gpa | Anstis Eq. Klc/MPa·m$^{1/2}$ | Evans Eq. Hv10/Gpa | Evans Eq. Klc/MPa·m$^{1/2}$ |
|---|---|---|---|---|---|---|
| BCH0 | 100 | 3.116545 | 16.97882 | 2.87493 | 15.96009 | 3.004464 |
| BCH1 | 75.89009 | 3.114353 | 16.4684 | 5.834349 | 15.4803 | 6.011852 |
| BCH3 | 37.489 | 3.120646 | 15.27982 | 5.239767 | 14.36303 | 5.210537 |
| BCH5 | 0 | 3.123405 | 16.4576 | 6.173287 | 15.47014 | 6.361273 |
| BCH7 | 0 | 3.131286 | 16.51733 | 6.516258 | 15.52629 | 6.723987 |
| BCH9 | 0 | 3.141779 | 16.5629 | 7.027912 | 15.56913 | 7.262442 |
| BCH11 | 0 | 3.155154 | 16.33944 | 7.558287 | 15.35907 | 7.758612 |
| BCH13 | 0 | 3.173494 | 17.24278 | 6.663723 | 16.20822 | 7.013818 |
| BCH15 | 0 | | 17.4938 | 7.7598 | 16.4441 | 8.2413 |

Summary of the properties of the Sialons Series BYH

| Sample | β/(β + α) % | Density g/cm$^3$ | Anstis Eq. Hv10/Gpa | Anstis Eq. Klc/MPa·m$^{1/2}$ | Evans Eq. Hv10/Gpa | Evans Eq. Klc/MPa·m$^{1/2}$ |
|---|---|---|---|---|---|---|
| BYH0 | 100 | 3.116545 | 16.97882 | 2.87493 | 15.96009 | 3.004464 |
| BYH1 | 100 | 3.133365 | 16.36067 | 5.535747 | 15.37903 | 5.684253 |
| BYH3 | 100 | 3.181129 | 16.37131 | 6.072495 | 15.38903 | 6.237563 |
| BYH5 | 100 | 3.222694 | 16.03007 | 6.211854 | 15.06827 | 6.316553 |
| BYH7 | 100 | 3.247436 | 15.8573 | 7.080275 | 14.90586 | 7.157837 |
| BYH9 | 100 | 3.279574 | 16.16715 | 6.013904 | 15.19712 | 6.139495 |
| BYH11 | 100 | 3.306895 | 17.01691 | 5.795583 | 15.99589 | 6.068705 |
| BYH13 | 100 | 3.322286 | 17.19927 | 4.285143 | 16.16731 | 4.511712 |

Summary of the properties of the Sialons series CCH

| Sample | β/(β + α) % | Density g/cm$^3$ | Anstis Eq. Hv10/Gpa | Anstis Eq. Klc/MPa·m$^{1/2}$ | Evans Eq. Hv10/Gpa | Evans Eq. Klc/MPa·m$^{1/2}$ |
|---|---|---|---|---|---|---|
| CCH2 | 57.99 | 3.156016 | 20.5475 | 4.718524 | 15.07317 | 4.797079 |
| CCH4 | 0 | 3.163498 | 22.3411 | 5.3631 | 21.0001 | 6.436 |
| CCH6 | 0 | 3.072244 | 21.1437 | 5.3418 | 19.8751 | 6.2352 |
| CCH8 | 0 | 3.184003 | 21.6825 | 5.7279 | 20.3815 | 6.7715 |
| CCH10 | 0 | 3.208667 | 21.3531 | 5.7233 | 20.0719 | 6.7127 |
| CCH12 | 0 | 3.222788 | 21.0242 | 5.5275 | 19.7628 | 6.4336 |
| CCH14 | 0 | 3.235922 | 20.606 | 5.7539 | 19.3696 | 6.6307 |
| CCH16 | 0 | 3.248631 | 20.9173 | 5.8811 | 19.6622 | 6.8286 |
| CCH18 | 0 | 3.259669 | 20.0268 | 5.50003 | 18.8252 | 6.2491 |
| CCH20 | 0 | 3.268306 | 20.0779 | 5.615 | 18.8732 | 6.3883 |

I claim:

1. A sintered ceramic material comprising a crystalline phase comprising alpha and/or beta sialon and an intergranular phase comprising a glass phase, wherein the material is manufactured from a starting powder being mixed with an additive comprising one or more metal from a group of Li, Na, Mg, Ca, Sr, Ba, Sc, Y, La, Ce, Pr, Nd, Sm, Eu, Gd, Tb, Dy, Ho, Er, Tm, Yb, Th, Pa, or U, and said additive being in non oxide form, or in a form which transforms to a metal or nitride during a synthesis in nitrogen atmosphere and the resulting glass phase having a high nitrogen content with a N:O atomic ratio higher than 35:65 and a glass transition temperature above 950° C.

2. A sintered ceramic material according to claim 1, wherein the material is manufactured from a starting powder being mixed with a sintering agent comprising said additives and said additives being in a form of pure metals, nitrides, hydrides, or another form that transforms to nitrides or metallic state during a heat treatment step at temperatures in the range of 1500-1800° C. in nitrogen atmosphere.

3. A sintered ceramic material according to claim 1, wherein the material is manufactured from a starting powder being mixed with a sintering agent comprising said additives and said additives being in a form of oxides or carbonates and being used together with graphite during a heat treatment step in nitrogen atmosphere at temperatures in the range of 1500-1800° C. in order to form a metal nitride through a carbothermal reduction.

4. A sintered ceramic material according to claim 1, wherein the crystalline phase comprises an alpha-sialon phase with a composition of $M_xSi_{12-(m+n)}Al_{(m+n)}O_nN_{16-n}$, where x $(=m/v) \leq 2$, and v is the average valence of an additive cation and a ratio of m/(m+n) is higher than 0.7, and wherein M is one or more metal from the group consisting of Li, Mg, Ca, Y and Rare Earth elements.

5. A sintered ceramic material according to claim 2, wherein the crystalline phase comprises an alpha-sialon phase with a composition of $M_xSi_{12-(m+n)}Al_{(m+n)}O_nN_{16-n}$, where x $(=m/v) \leq 2$, and v is the average valence of a M cation and a ratio of m/(m+n) is higher than 0.7, and wherein M is one or more metal from the group consisting of Li, Mg, Ca, Y and Rare Earth elements.

* * * * *